Oct. 11, 1938.  B. C. MOISE  2,132,574

PIPE JOINT

Filed Oct. 22, 1936

Inventor:
BOLTON C. MOISE,
by Usina & Rauber
his Attorneys.

Patented Oct. 11, 1938

2,132,574

UNITED STATES PATENT OFFICE 2,132,574

PIPE JOINT

Bolton C. Moise, Pittsburgh, Pa., assignor to National Tube Company, a corporation of New Jersey Application October 22, 1936, Serial No. 107,076

1 Claim. (Cl. 285—148)

This invention relates to pipe joints and more particularly to a seal or liner therefor.

Many attempts have been made to render pipe joints gas-tight by providing satisfactory seals. Threading requirements and specifications have become extremely rigid but in spite of the fine degree of accuracy with which threads are now formed, it is at present impossible to provide a threaded gas-tight joint.

In addition, pipes having non-corrosive linings, particularly copper, have heretofore been used but not extensively, due to difficulty with the joints. It has been shown that galvanic or electrolytic action between the two unlike metals at the ends of the pipe when contacted with a fluid has quickly destroyed the joints. Various means have been proposed to overcome this, but all of them are imperfect in making a tight seal, and, moreover, where it is necessary to cut, under service conditions, the lengths furnished by the factory, the original difficulty is again encountered.

It is accordingly among the objects of my invention to provide an improved liner or seal for pipe joints.

A further object of my invention is to provide an improved joint for pipes having a non-corrosive lining.

The foregoing and further objects will be apparent after referring to the drawing, in which.

Figure 1:
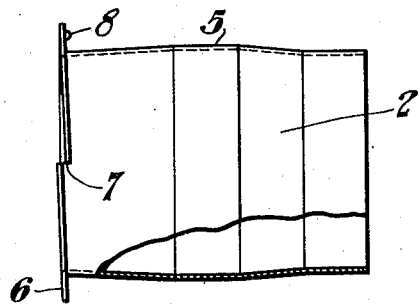
Figure 1 is a plan of a preferred embodiment of my improved liner for pipe joints.
Figure 2:
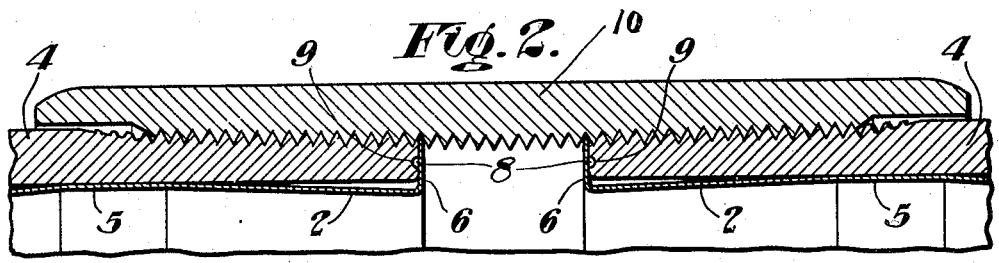
Figure 2 is a longitudinal section of the pipe joint of Figure 1.

Referring more particularly to the drawing, the numeral 2 designates a preferred embodiment of the improved liner of the present invention which is preferably made of a soft or plastic metal or an alloy thereof. In order to insure the liner seating tightly within the pipe, an annular bead or bulge 5 of slightly larger diameter than the inside diameter of the pipe 4 is formed thereon adjacent the inner end by expanding the liner at that point.

An integral flange 6 is formed on the opposite or outer end of the liner 2. The width of the flange 6 is substantially the same as the wall thickness of the pipe 4 but such that the diameter is no greater than that of the end of the threaded pipe 4. The flange 6 is broken, as at 7, and the periphery has the form of one turn of a helix of the same pitch as the pitch of the threads on the pipe 4. One or more inwardly projecting portions 8 may be provided on the flange 6 adapted to be disposed within depressions or slots 9 in the end of pipe 4. In this manner the liner 2 is frictionally held within the pipe 4 by the annular bead 5 and is positively held against rotation therein by the inwardly projecting portions 8 disposed within the depressions or slots 9. Consequently, since the periphery of the flange 6 has the same pitch as the threads of the pipe, the liner 2 being positioned within the end of the pipe 4 with the flange 6 abutting thereagainst, the flange 6 will engage the threads of the coupling 10 and be advanced into the coupling 10 at the same rate as the pipe 4 when they are screwed together and, due to the taper of the coupling 10, will become securely wedged therein and provide an effective seal.

Figure 3:
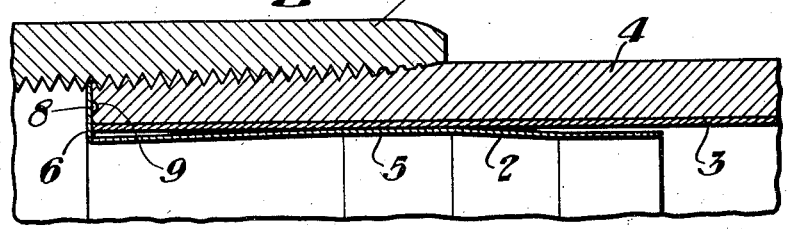
Figure 3 is a longitudinal section of a joint for lined pipe employing the improved liner of the present invention.

When used in combination with a pipe having a non-corrosive lining 3 and a coupling made of a non-corrosive metal or having a non-corrosive lining, the liner, pipe lining, and coupling are formed from metals of such nature that the passage of fluid therethrough will not cause a galvanic or electrolytic action therebetween. Consequently, since the flange 6 closely contacts the threads of the coupling 10 the fluid transmitted cannot contact the unlike metal of the pipe 4. Hence, I am enabled to form a joint for copper lined pipe by use of a copper liner and a coupling preferably of brass that will not be subject to galvanic or electrolytic action when fluid is passed through the joint and should normally therefore last as long as the non-corrosive lining in the pipe. A joint such as described is shown in Figure 3.

Figure 4:
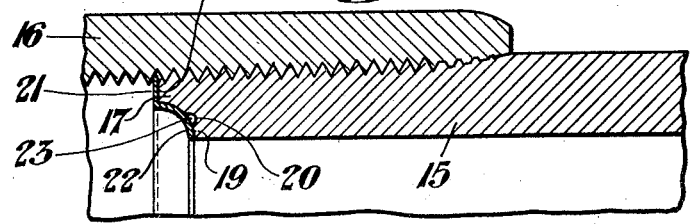
Figure 4 is a longitudinal section of a modified form of liner.

Referring to Figure 4 of the drawing, a modified form of the invention is shown as comprising an embodiment for use in connection with an oil-well casing. According to this modification, the externally threaded ends 15 of the casing are shown as connected by a conventional internally threaded coupling 16. The extremities 17 of the casings 15 are provided with narrow flat portions 18 which extend radially inward from their outside surfaces and adjoin radially, inwardly-extending concaved portions 19 which are provided with one or more detents 20. The liner 22 of this embodiment is shaped to conform to the extremities 17 of the casings 15 and is of the same or slightly greater diameter. This liner 22 is provided with one or more inwardly projecting portions 23 which seat in the detents 20 in the concaved portions 19 of the extremities 17 of the casings 15.

While I have shown and described several preferred embodiments of my invention, it will be understood that I do not wish to be limited exactly thereto since various modifications may be made without departing from the scope of the invention as defined in the appended claim.

I claim:

In an externally threaded pipe for carrying corrosive fluids wherein the end of said pipe is exposed thereto, of means to protect the end of said pipe from corrosive action, said means comprising a separable annular liner for the end of said pipe, said liner having a radially extending flange at its outer end, said flange being adapted to extend across the end of the wall of said pipe to substantially the crest of the external threads thereon, said flange being split to enable the conformation of its periphery to the pitch of the external threads on said pipe, said liner being provided with means for insuring its rotation with said pipe whereby the periphery of the flange of said liner will be deformed into tight sealing engagement with the threads of an internally threaded member to which said externally threaded pipe may be connected.

BOLTON C. MOISE.